Feb. 4, 1958 H. SCHILLER 2,822,481
DIELECTRIC VOLTAGE TRANSFORMERS
Filed June 8, 1954

Inventor:
Heinrich Schiller,
By Pierce, Scheffler & Parker,
Attorneys.

United States Patent Office 2,822,481
Patented Feb. 4, 1958

2,822,481

DIELECTRIC VOLTAGE TRANSFORMERS

Heinrich Schiller, Zurich, Switzerland

Application June 8, 1954, Serial No. 435,257

7 Claims. (Cl. 307—109)

It is known to subdivide an electric voltage appearing between two conductors or between one conductor and earth by inserting an intermediate electrode into the space between the two conductors or between conductor and earth respectively, regardless of whether the space is filled with either air or a liquid or solid insulating material. This method of capacitive or dielectric voltage transforming has been applied particularly in bushing insulators. Likewise special coupling capacitors have been connected to high tension lines which serve for voltage transformation as well. In order to correct step-down ratio and angular errors occurring with capacitive voltage transformers correcting elements have been inserted between the transformers and their secondary load as measuring instruments.

According to the invention neither bushing insulators nor special coupling capacitors are used for the voltage transformation, but a cable section with one or several intermediate conductive layers embedded into its insulation. To this layer or layers means to correct the angular and step-down ratio errors is connected in addition to the secondary circuit.

This invention is illustrated by the annexed drawings in which.

Figure 1:
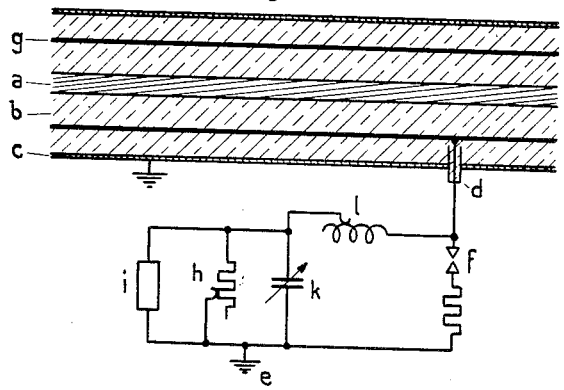
Fig. 1 represents a longitudinal section of a voltage transformer cable including the corrective device and a protective gap.

Fig. 1 depicts a section of a single wire high tension cable the conductor $a$ of which is surrounded with insulation material $b$ and a grounded metal coat $c$. A metallic intermediate layer $g$ is embedded concentrically in the insulation $b$. The layer $g$ is galvanically connected via an insulating bushing $d$ to the secondary load $i$ the other pole of which is grounded at $e$. This load consists of one or more electrical measuring devices as instruments (voltmeter, wattmeter, phasemeter, synchronoscope) relays or the like. As a protection against voltage surges and lightning a protective gap $f$ including a grounding resistor is provided. It is not relevant whether the inner cable conductor $a$ is full (as shown) or hollow The external as well as the internal diameter of the conductor $a$ may change over the length of the cable section used for voltage transformation.

In order to compensate for the step-down ratio and the angular errors originated by the dielectric voltage transformer formed by the cable section a system of adjustable circuit elements consisting of choke $l$, capacitor $k$ and resistor $h$ is provided. Within certain load limits additional apparatuses or lines may be connected to the secondary terminals, without requiring further adjustment of the said correcting elements. Should the load exceed these limits the said elements must undergo readjustment.

Figure 2:
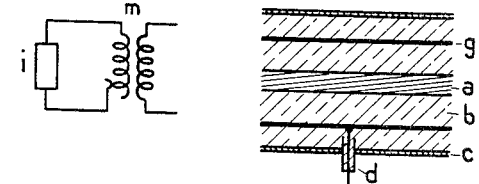
Fig. 2 shows the supply of the secondary circuit via a wound insulating transformer.

Instead of connecting the secondary load $i$ directly to cable and ground a wound low tension intermediate transformer $m$ with constant or, for correction, controllable step-down ratio may be inserted, as per Fig. 2. If the transformer $m$ can be controlled the choke $l$ may possibly be omitted.

Figure 3:
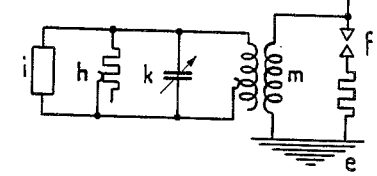
Fig. 3 shows the same combination as Fig. 2 with the correcting element between insulating transformer and secondary circuit.

In some cases it is advantageous to connect the correcting elements $h$ and $k$ via the insulating transformer $m$ in addition to the load $i$, as illustrated in Fig. 3.

Unless it is preferred in some cases to provide the entire cable with the intermediate layer $g$ the length of the cable section serving as a voltage transformer will have to be determined according to the kind and the power rating of the connected secondary load.

The invention will allow to replace advantageously the expensive magnetic voltage transformers by much cheaper equipment, since interconnecting cables are required for the plants anyhow and since the said cables when equipped with intermediate layer and correcting device will cost essentially less than wound voltage transformers, particularly for high tension plants. At higher tension it will pay to provide a cable section serving as voltage transformer even in cases where an interconnecting cable would be superfluent.

Figure 4:
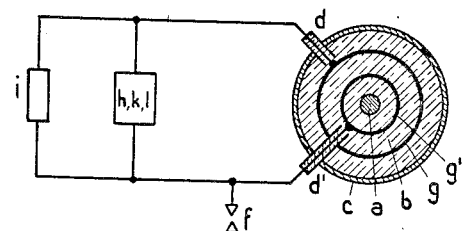
Fig. 4 shows a cross-section of a cable with two embedded conductive layers connected with the secondary circuit provided with corrective and protective means.

If grounding of the cable coat is not opportune or if different secondary voltages are desired or owing to other reasons, more than one intermediate conductive layer $g$, $g'$ can be applied as shown in Fig. 4 in which the same designation letters are used as in Fig. 1.

Figures 5, 6:
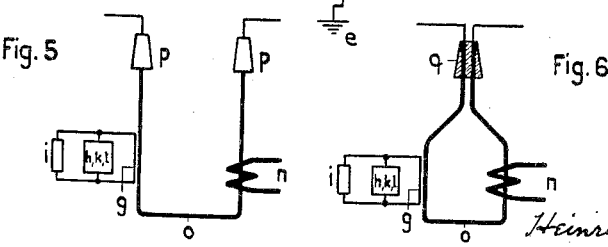
Fig. 5 shows a voltage transformer cable inserted into the line in combination with a current transformer.
Fig. 6 shows the same arrangement as Fig. 5, but with a double wire end sleeve.

A further object of my invention is to combine the said cable voltage transformer with one or more current transformers so as to make up an individual group, inasmuch as the known cable current transformers can be inserted into the cable serving as voltage transformer. As per Figs. 5 and 6, both ends of the cable $o$ are placed either into two separate end sleeves $p$ (Fig. 5) or into a a single common end sleeve $q$ (Fig. 6). The secondary load $i$ and the correcting device $h, k, l$ is connected to the intermediate layer $g$ of the cable $o$, and $n$ denotes the secondary winding of the current transformer, all schematically. Owing to the power rating of the current transformer the cable may be looped through the core of the current transformer once or several times in order to attain the necessary ampere-turns.

Having now described my invention referring to the accompanying drawings, I declare what I claim is:

1. In combination, a dielectric voltage transformer comprising a lentgh of electric cable, said cable being comprised of an inner central conductor, an outer grounded sheath and at least one conductive layer intermediate said sheath and inner conductor, and a secondary circuit connected to said intermediate conductive layer, said secondary circuit being constituted solely by an electrical measuring means and a corrective network interposed between said measuring means and said intermediate conductive layer for compensating for the step-down ratio and angular errors originating in said transformer thereby to maintain optimum accuracy of measurement in said measuring means notwithstanding changes of magnitude in the primary side of said transformer.

2. The invention as defined in claim 1 wherein said network is comprised of adjustable choke, capacitor and resistor elements.

3. The invention as defined in claim 1 and which further includes an intermediate transformer between said load device and said network.

4. The invention as defined in claim 1 and which further includes an intermediate transformer between said network and said intermediate conductive layer.

5. The invention as defined in claim 1 wherein said electric cable comprises a pair of concentric radially spaced intermediate conductive layers and said secondary circuit is connected to said intermediate conductive layers such that the voltage between said layers is applied to said secondary circuit.

6. The invention as defined in claim 1 wherein said inner conductor of said length of electric cable constitutes the primary of a current transformer, and which further includes a winding inductively coupled to said inner conductor and constituting the secondary winding of said current transformer.

7. The invention as defined in claim 6 wherein the two ends of said cable are enclosed within a common end sleeve.

References Cited in the file of this patent

UNITED STATES PATENTS

| | | |
|---|---|---|
| 1,816,717 | Belt | July 28, 1931 |
| 1,870,851 | Jones | Aug. 9, 1932 |
| 1,981,716 | Austin | Nov. 20, 1934 |
| 2,004,954 | Langguth | July 18, 1935 |